(12) United States Patent
Kunick

(10) Patent No.: US 6,970,286 B1
(45) Date of Patent: Nov. 29, 2005

(54) MULTIPLE FIELD OF VIEW REFLECTIVE TELESCOPE

(75) Inventor: Joseph M. Kunick, Victor, NY (US)

(73) Assignee: Corning Incorporated, Corning, NY (US)

( * ) Notice: Subject to any disclaimer, the term of this patent is extended or adjusted under 35 U.S.C. 154(b) by 48 days.

(21) Appl. No.: 10/874,623

(22) Filed: Jun. 23, 2004

(51) Int. Cl.[7] ............................ G02B 23/00; G02B 5/00
(52) U.S. Cl. ...................... 359/366; 359/364; 359/729; 359/859
(58) Field of Search .............................. 359/363–367, 359/725–732, 850–861, 432

(56) References Cited

U.S. PATENT DOCUMENTS

| | | | |
|---|---|---|---|
| 3,674,334 A | 7/1972 | Offner | 359/365 |
| 4,205,902 A | 6/1980 | Shafer | 359/366 |
| 4,226,501 A | 10/1980 | Shafer | 359/366 |
| 4,265,510 A | 5/1981 | Cook | 359/366 |
| 4,691,999 A | 9/1987 | Wheeler | 359/859 |
| 4,804,258 A | 2/1989 | Kebo | 359/366 |
| 5,142,417 A | 8/1992 | Brunn | 359/859 |
| 5,144,476 A * | 9/1992 | Kebo | 359/366 |
| 5,173,801 A | 12/1992 | Cook | 359/365 |
| 5,309,276 A | 5/1994 | Rodgers | 359/366 |
| 5,331,470 A * | 7/1994 | Cook | 359/859 |
| 5,477,395 A * | 12/1995 | Cook | 359/861 |
| 5,627,675 A | 5/1997 | Davis et al. | 359/366 |
| 5,640,008 A | 6/1997 | Bosch et al. | 250/237 |
| 5,831,762 A * | 11/1998 | Baker et al. | 359/353 |
| 5,847,879 A | 12/1998 | Cook | 359/631 |
| 5,953,155 A * | 9/1999 | Eckel et al. | 359/432 |
| 6,084,727 A * | 7/2000 | Cook | 359/850 |
| 6,109,756 A | 8/2000 | Takahashi | 359/857 |
| 6,120,156 A | 9/2000 | Akiyama | 359/857 |
| 6,268,963 B1 | 7/2001 | Akiyama | 359/631 |
| 6,406,156 B1 | 6/2002 | Lin | 359/858 |
| 6,441,957 B1 | 8/2002 | Teuchert et al. | 359/364 |

* cited by examiner

*Primary Examiner*—Thong Q Nguyen
(74) *Attorney, Agent, or Firm*—Timothy M. Schaeberle

(57) ABSTRACT

A reflective afocal telescope is described herein that has multiple field of views and can be packaged in a compact arrangement. In one embodiment, the reflective telescope includes two entrance pupils, a primary mirror, a secondary mirror, a tertiary mirror, a quaternary mirror, a moveable fold mirror and an exit pupil. The fold mirror can be moved into a non-bypass position and out of the way such that the incident beams transverse the primary, secondary, tertiary and quaternary mirrors and form a collimated region and a real external exit pupil. Or, the fold mirror can be moved into a bypass position where the incident beams bypass the primary, secondary, tertiary and quaternary mirrors and instead reflect off the fold mirror directly to the exit pupil. In an alternative embodiment, the tertiary mirror instead of the fold mirror can be moved into either the bypass position or the non-bypass position.

15 Claims, 7 Drawing Sheets

MULTIPLE FIELD OF VIEW REFLECTIVE TELESCOPE

BACKGROUND OF THE INVENTION

1. Field of the Invention

The present invention relates generally to the field of optical systems and more particularly to a multiple field of view reflective telescope.

2. Description of Related Art

A reflective (catoptric) telescope with a wide field of view is commonly used today in space-based surveillance sensors. One of the first types of these reflective telescopes that were developed to address the multi-spectral large aperture requirements of space-based surveillance sensors is known as the three mirror anastigmatic optical system. FIG. 1 (PRIOR ART) illustrates one embodiment of a three mirror anastigmatic optical system 100 that is disclosed in U.S. Pat. No. 3,674,334. The three mirror anastigmatic optical system 100 includes an entrance pupil 102 where incident beams 104 from an object (not shown) pass through and are reflected by a primary mirror 106 which causes the beams 104 to converge to beams 108 and form an intermediate image 110. The beams 108 are incident on a secondary mirror 112 which reflects divergent beams 114. The beams 114 are incident on a tertiary mirror 116 which reflects and substantially collimates beams 118 to an exit pupil 120. A more detailed discussion about this embodiment and other embodiments of the three mirror anastigmatic optical system 100 is provided in U.S. Pat. No. 3,674,334 the contents of which are incorporated by reference herein.

The main problem with the three mirror anastigmatic optical system 100 is that it is often too large to be effectively used in a space-based surveillance sensor. To address this problem, John M. Rodgers added a fourth mirror to the three mirror anastigmatic optical system 100 which enabled one to fold the optical design into a more compact arrangement. FIG. 2 (PRIOR ART) illustrates the four mirror anastigmatic optical system 200 invented by John M. Rodgers and patented in U.S. Pat. No. 5,309,276 the contents of which are incorporated herein. The four mirror anastigmatic optical system 200 includes an entrance pupil 202 where incident beams 204 from an object (not shown) pass through and are reflected by a primary mirror 206 which causes the beams 204 to converge to beams 208. The beams 208 are incident on a secondary mirror 210 which reflects convergent beams 212. The beams 212 are incident on a tertiary mirror 214. Beams 216 are reflected from the tertiary mirror 214 to a fourth mirror 218 which substantially collimates beams 220 to an exit pupil 222. It should be noted that beams 216 form an intermediate image 215 just after the tertiary mirror 214. As can be seen, the tertiary mirror 214 is disposed at a large tilt angle (for example 43°) with the incident beam 204, thereby providing a beam folding configuration wherein reflected beams 216 and 220 pass in front of the primary mirror 206 twice. This provides a beam folding function between the entering and exiting beams that allows an extremely compact system configuration. Unfortunately, the four mirror anastigmatic optical system 200 does not support multiple field of views. This need and other needs are satisfied by the multiple field of view reflective telescope of the present invention.

BRIEF DESCRIPTION OF THE INVENTION

The present invention includes a reflective telescope that has multiple field of views and can be packaged in a compact arrangement. In one embodiment, the reflective telescope includes two entrance pupils, a primary mirror, a secondary mirror, a tertiary mirror, a quaternary mirror, a moveable fold mirror and an external exit pupil. The fold mirror can be moved into a non-bypass position and out of the way such that the incident beams transverse the primary, secondary, tertiary and quaternary mirrors and are collimated, forming an external exit pupil. Or, the fold mirror can be moved into a bypass position where the incident beams bypass the primary, secondary, tertiary and quaternary mirrors and instead reflect off the fold mirror directly to the exit pupil. In an alternative embodiment, the tertiary mirror instead of the fold mirror can be moved into either the bypass position or the non-bypass position.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
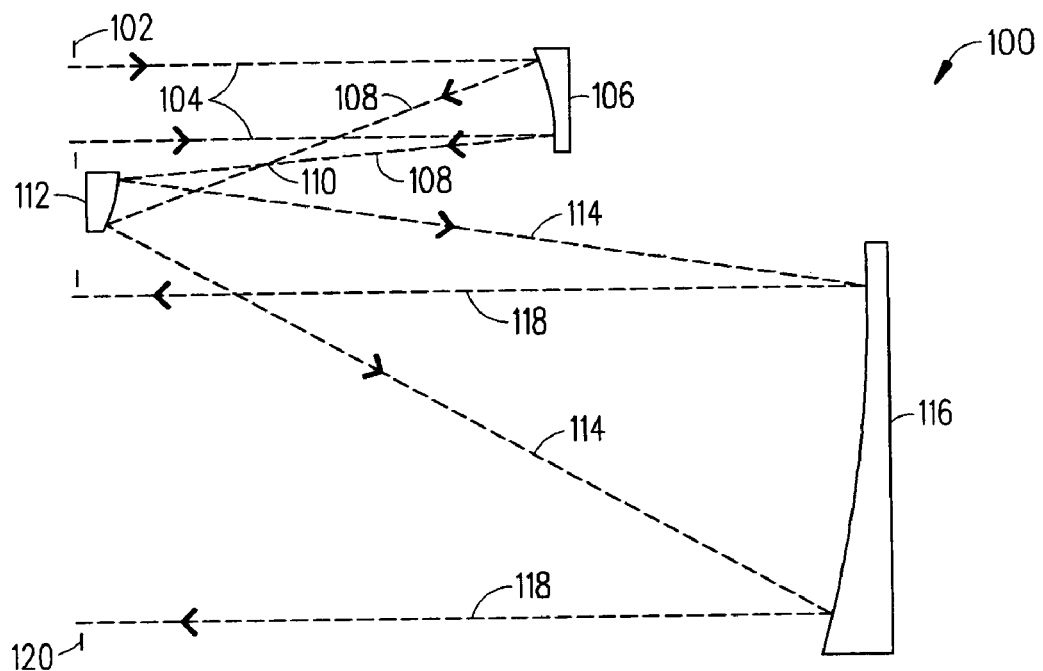
FIG. 1 (PRIOR ART) is a diagram that illustrates a traditional three mirror anastigmatic optical system that is disclosed in U.S. Pat. No. 3,674,334.
Figure 2:
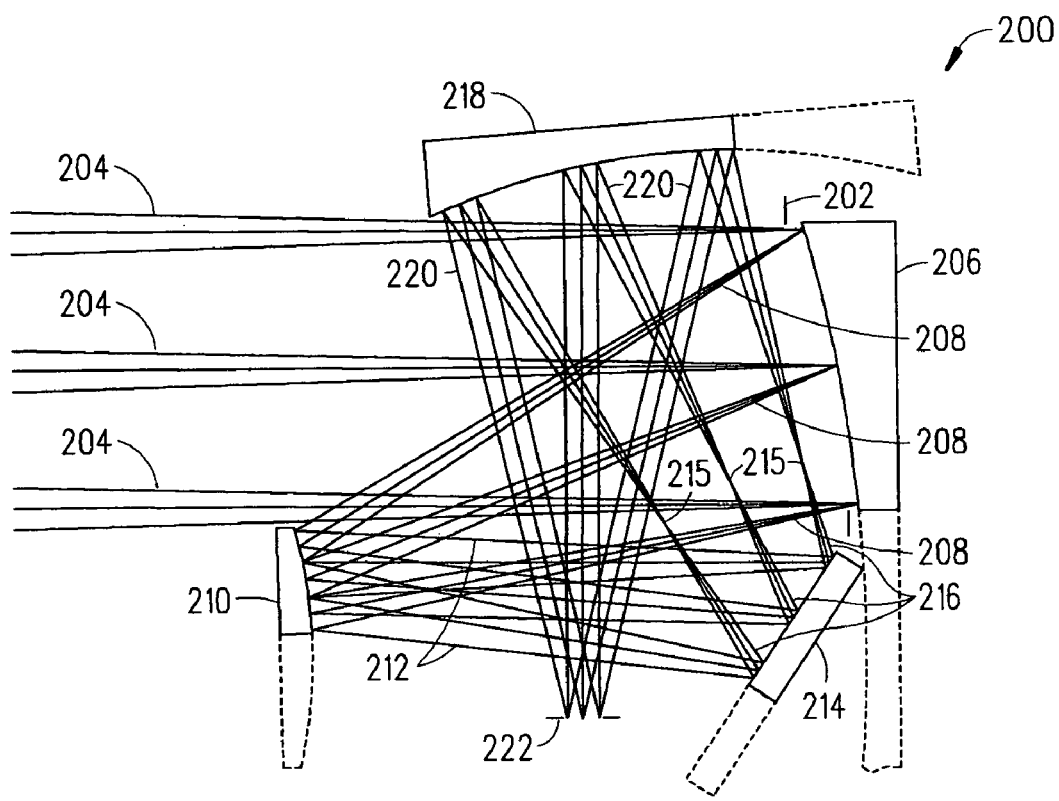
FIG. 2 (PRIOR ART) is a diagram that illustrates a traditional four mirror anastigmatic optical system that is disclosed in U.S. Pat. No. 5,309,276.
Figure 3:
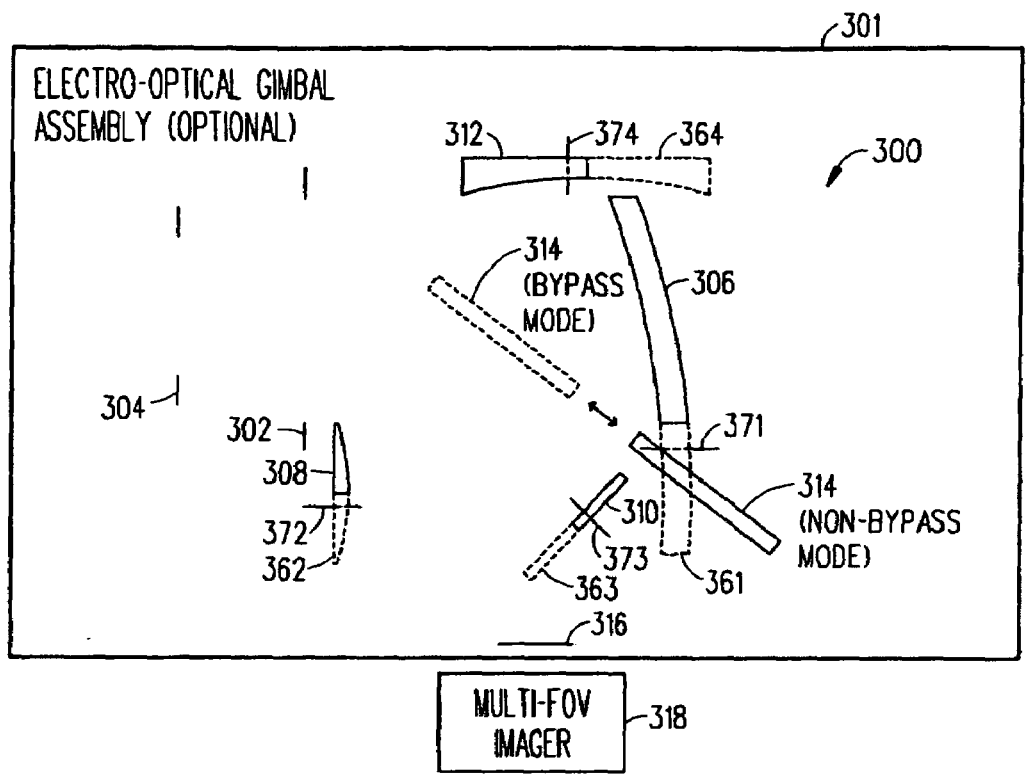
FIG. 3 is a diagram illustrating the basic components of a multiple field of view reflective telescope in accordance with the present invention.

Referring to FIGS. 3–5, there are shown several diagrams of a preferred embodiment of a reflective telescope 300 in accordance with the present invention. As shown in FIG. 3, the reflective telescope 300 includes a first (large) entrance pupil 302, a second (small) entrance pupil 304, a primary mirror 306, a secondary mirror 308, a tertiary mirror 310, a quaternary mirror 312, a moveable fold mirror 314 (movable fold flat 314) and an exit pupil 316. A multiple field of view imager 318 is coupled to the exit pupil 316. The reflective telescope 300 allows multiple field of views to be accommodated as described in detail below with respect to FIGS. 4–5.

Figure 4A:
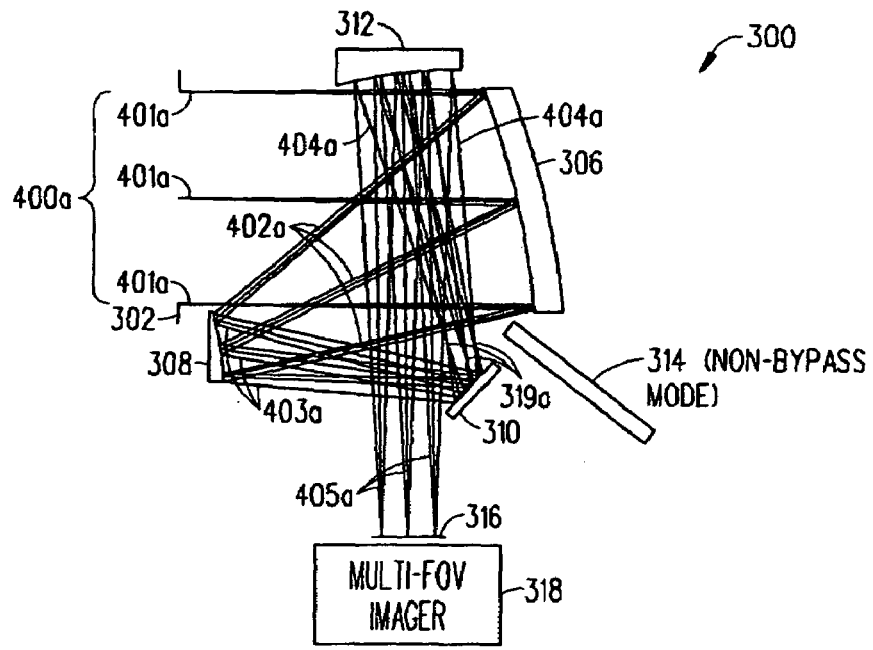
FIGS. 4A–4D are diagrams illustrating the reflective telescope when a fold mirror is positioned in a non-bypass mode which enables an ultra narrow field of view (FIG. 4A) or a medium field of view (FIG. 4B) to be analyzed by a multiple field of view imager in accordance with the present invention.

Referring to FIGS. 4A–4D, there are diagrams of the reflective telescope 300 where the fold mirror 314 is positioned in a non-bypass mode which accommodates an ultra narrow field of view 400a (FIG. 4A) or a medium field of view 400b (FIG. 4B) in accordance with the present invention. As shown in FIG. 4A, the incident beams 401a (optical beams 401a) from an object (not shown) which are associated with the ultra narrow field of view 400a are passed through the first (large) entrance pupil 302. The beams 401a are then reflected by the primary mirror 306 (e.g., primary aspheric concave mirror 306) which causes the beams 401a to converge to beams 402a. Beams 402a are incident on the secondary mirror 308 (e.g., secondary aspheric convex mirror 308) which reflects convergent beams 403a. Beams 403a are incident on the tertiary mirror 310 (e.g., tertiary aspheric mirror 310) which reflects convergent beams 404a to form an intermediate image 319a. From the intermediate image 319a, beams 404a diverge and are incident on the quaternary mirror 312 (e.g., quaternary aspheric concave mirror 312) which substantially collimates and reflects beams 405a to the exit pupil 316. The exit pupil 316 is sufficiently clear of the quaternary mirror 312 so as to provide a convenient coupling for the multiple field of view imager 318. The multiple field of view imager 318 is set to operate in a narrow field of view mode so it can analyze beams 405a. As can be seen, the tertiary mirror 310 is disposed at a large tilt angle (for example 43°) with the incident beams 401a, thereby providing a beam folding configuration wherein reflected beams 404a and 405a pass in front of the primary mirror 306 twice. This provides a beam folding function between the entering and exiting beams 401a and 405a that allows an extremely compact system configuration.

Figure 4B:
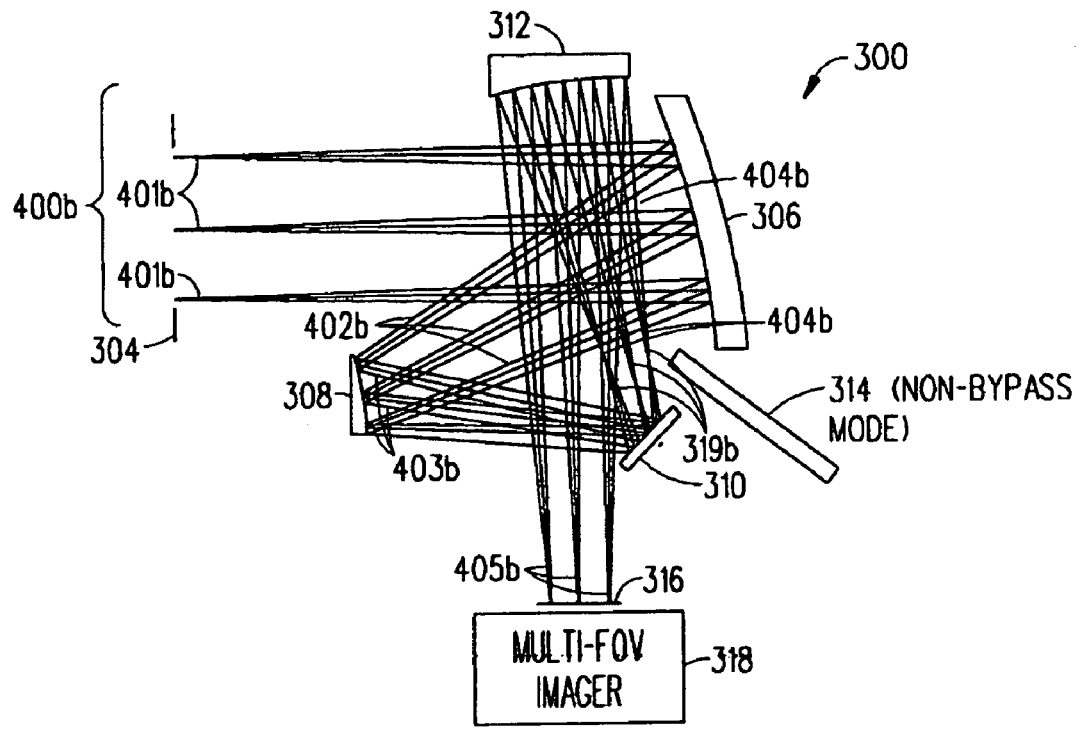

As shown in FIG. 4B, the incident beams 401b (optical beams 401b) from an object (not shown) which are associated with the medium field of view 400b are passed through the second entrance pupil 304 (small aperture 304). The beams 401b are then reflected by the primary mirror 306 (e.g., primary aspheric concave mirror 306) which causes the beams 401b to converge to beams 402b. Beams 402b are incident on the secondary mirror 308 (e.g., secondary aspheric convex mirror 308) which reflects convergent beams 403b. Beams 403b are incident on the tertiary mirror 310 (e.g., tertiary aspheric mirror 310) which reflects convergent beams 404b to form an intermediate image 319b. From the intermediate image 319b, beams 404b diverge and are incident on the quaternary mirror 312 (e.g., quaternary aspheric concave mirror 312) which substantially collimates and reflects beams 405b to the exit pupil 316. The multiple field of view imager 318 which is coupled to the exit pupil 316 is set to operate in a wide field of view mode so it can analyze beams 405b.

Figure 4C:
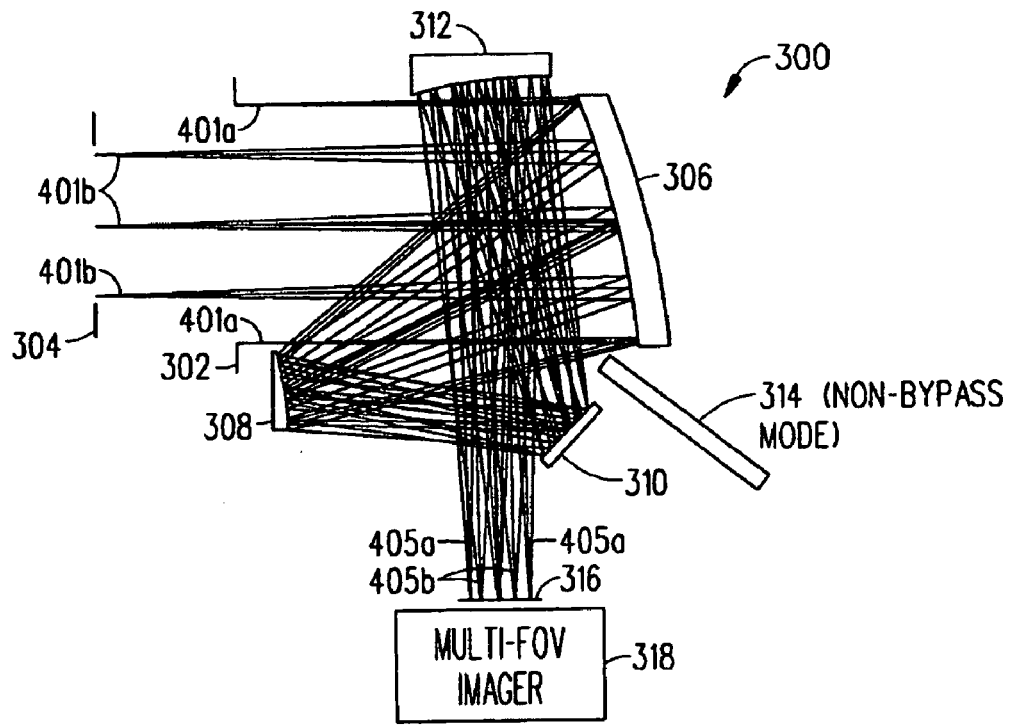
Figure 4D:
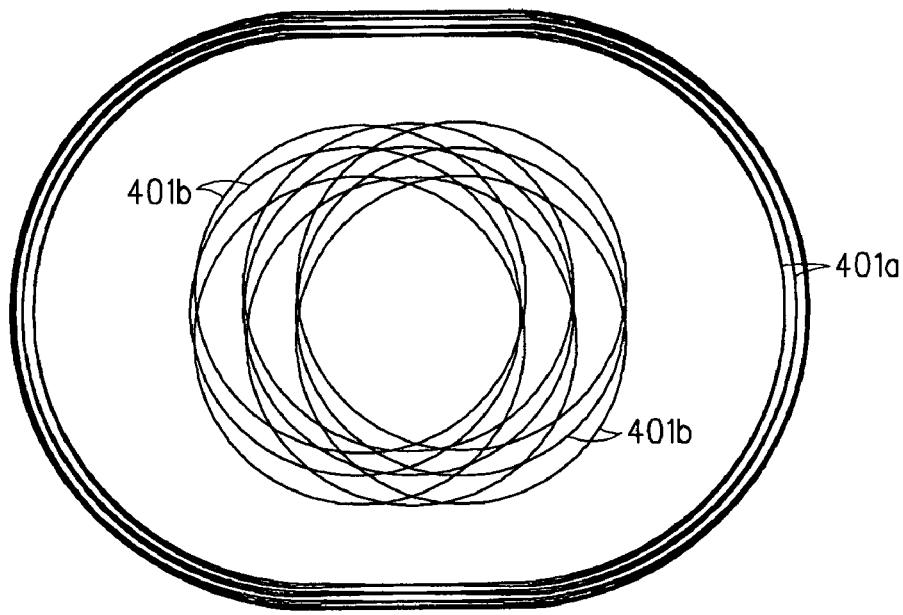

As shown in FIG. 4C, there is a diagram of the reflective telescope 300 that illustrates the beams 401a . . . 405a and 401b . . . 405b for both the ultra narrow field of view 400a and the medium field of view 400b which are overlaid on top of one another when the fold mirror 314 is positioned in the non-bypass mode. In the preferred embodiment, the multiple field of view imager 318 is controlled to operate in either a narrow field of view mode or a wide field of view mode to separately analyze beams 405a or 405b. However, in an alternative embodiment two separate imagers 318 can be used to analyze beams 405a and 405b at the same time. FIG. 4D illustrates the image that beams 401a and 401b make on the primary mirror 306. In the preferred embodiment, the primary mirror 306 has a racetrack shape which is the optimum shape from an aberration standpoint. Alternatively, the primary mirror 306 can have a circular or rectangular shape.

Figure 5A:
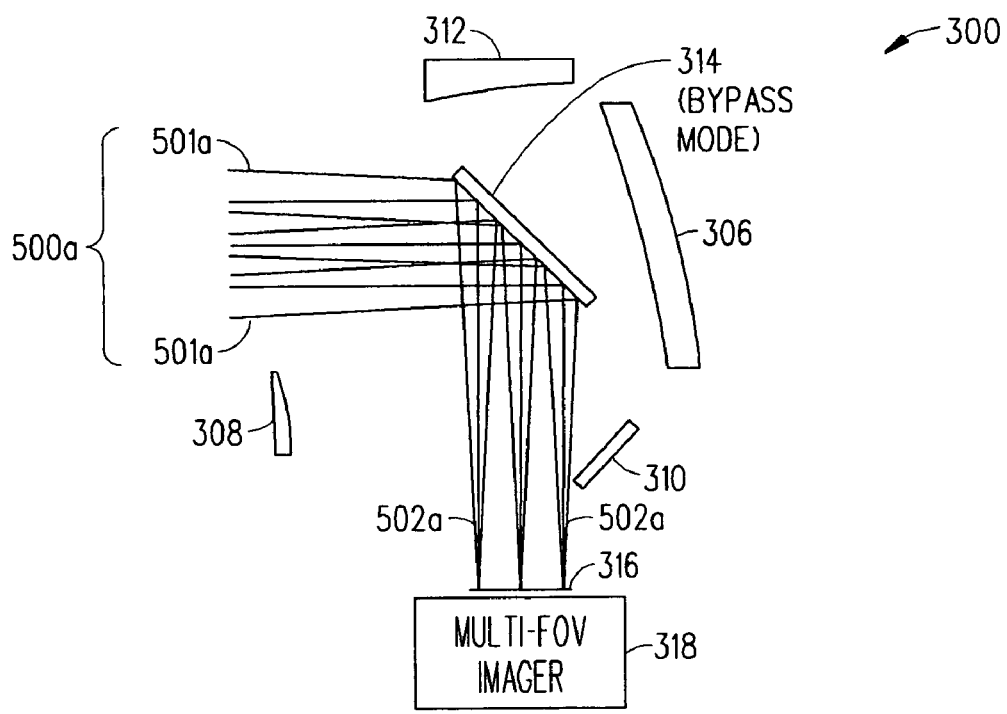
FIGS. 5A–5C are diagrams illustrating the reflective telescope when a fold mirror is positioned in a bypass mode which enables a narrow field of view (FIG. 5A) or a wide field of view (FIG. 5B) to be analyzed by a multiple field of view imager in accordance with the present invention.
Figure 5B:
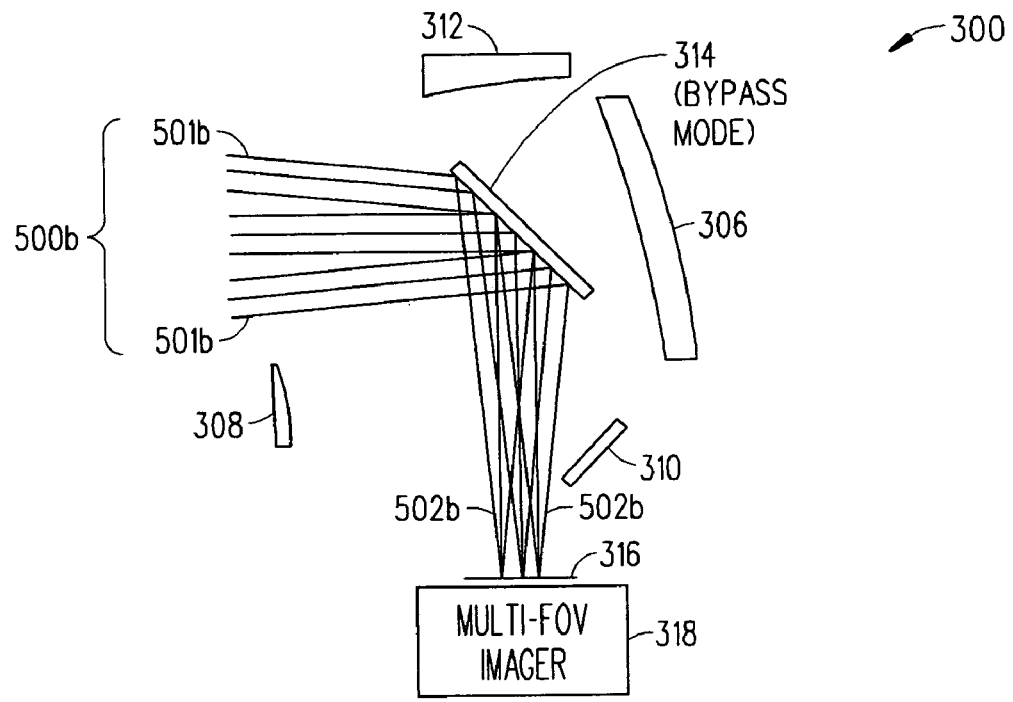
Figure 5C:
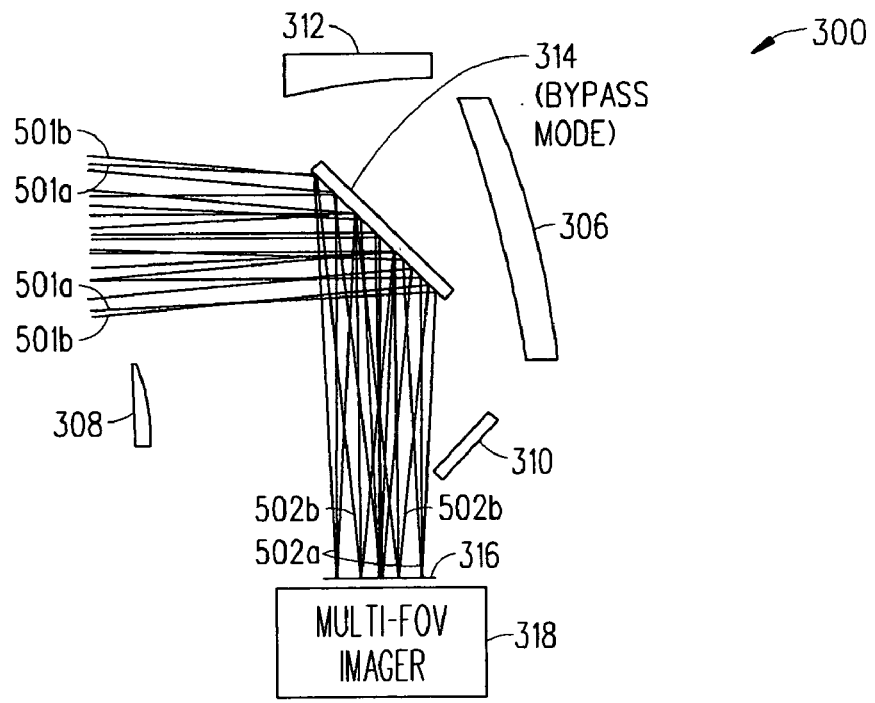

Referring to FIGS. 5A–5C, there are diagrams of the reflective telescope 300 where the fold mirror 314 is positioned in a bypass mode which accommodates a narrow field of view 500a (FIG. 5A) or a wide field of view 500b (FIG. 5B) in accordance with the present invention. As shown in FIG. 5A, the incident beams 501a (optical beams 501a) from an object (not shown) which are associated with the narrow field of view 500a are reflected by the fold mirror 314 which directs beams 502a to the exit pupil 316. The multiple field of view imager 318 which is coupled to the exit pupil 316 is set to operate in a narrow field of view mode so it can analyze beams 502a.

As shown in FIG. 5B, the incident beams 501b (optical beams 501b) from an object (not shown) which are associated with the wide field of view are reflected by the fold mirror 314 which directs beams 502b to the exit pupil 316. The multiple field of view imager 318 which is coupled to the exit pupil 316 is set to operate in a wide field of view mode so it can analyze beams 502b. FIG. 5C is a diagram of the reflective telescope 300 that illustrates the beams 501a, 502a, 501b and 502b associated with both the narrow field of view 500a and the wide field of view 500b which are overlaid on top of one another when the fold mirror 314 is positioned in the bypass mode. Again in the preferred embodiment, the multiple field of view imager 318 is controlled to operate in either a narrow field of view mode or a wide field of view mode to separately analyze beams 502a or 502b. However, in an alternative embodiment two separate imagers 318 can be used to analyze beams 502a and 502b at the same time.

Figure 6:
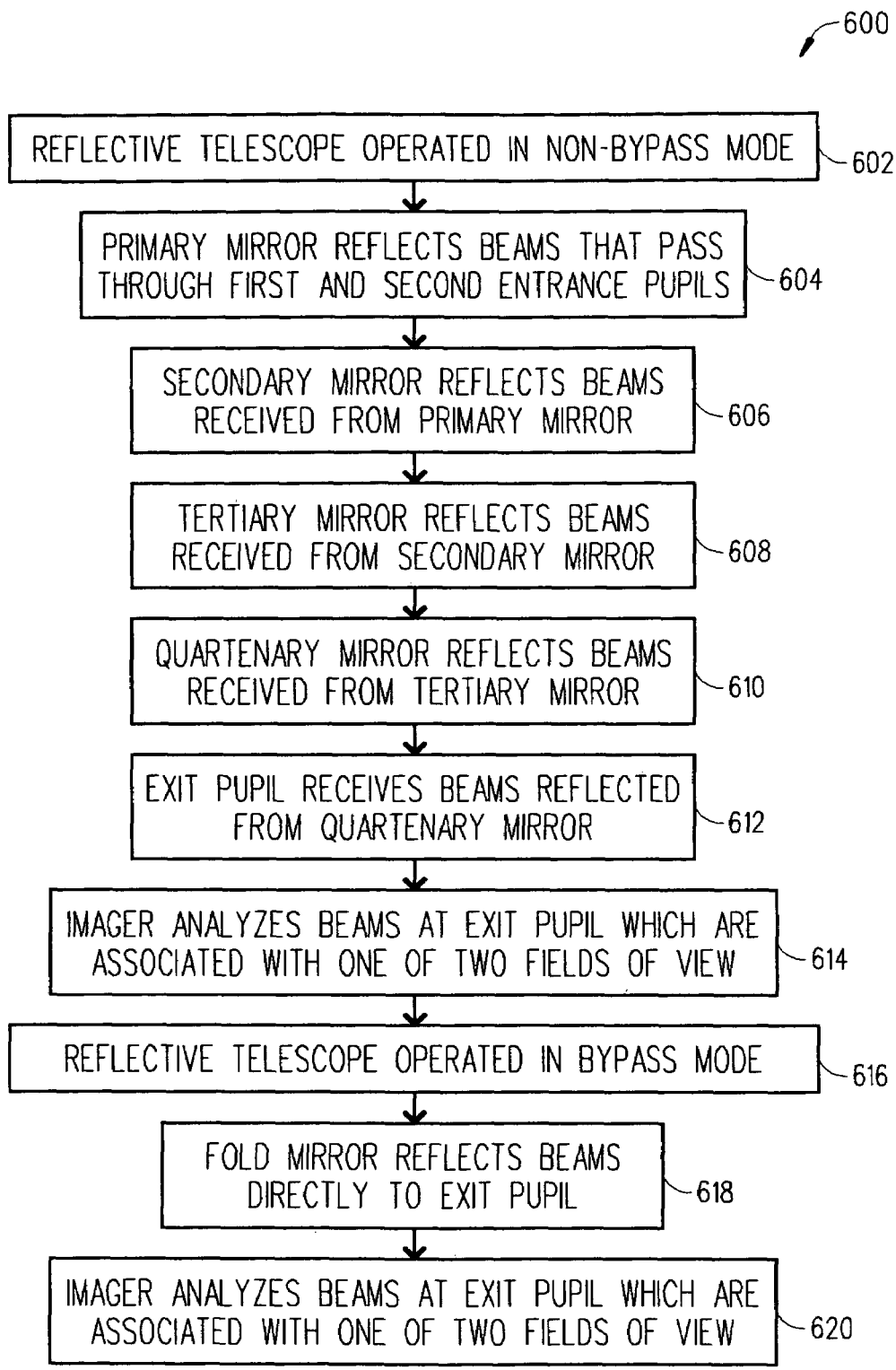
FIG. 6 is a flowchart illustrating the basic steps of a preferred method for enabling multiple afocal functions in the reflective telescope shown in FIG. 3 in accordance with the present invention.

Referring to FIG. 6, there is a flowchart illustrating the basic steps of a preferred method 600 for enabling multiple afocal functions in the reflective telescope 300. The reflective telescope 300 can be configured to be operated (step 602) in the non-bypass mode where the fold mirror 314 is positioned such that incident beams 401a and 401b transverse the reflective telescope 300 (see FIGS. 4A–4C). In particular, when the reflective telescope 300 is operated in the non-bypass mode then the incident beams 401a and 401b which respectively pass through the first and second entrance pupils 302 and 304 are reflected (step 604) by the primary mirror 306 that causes the beams 401a and 401b to converge to beams 402a and 402b. Beams 402a and 402b are incident on the secondary mirror 308 which reflects (step 606) convergent beams 403a and 403b. Beams 403a and 403b are incident on the tertiary mirror 310 which reflects (step 608) beams 404a and 404b to the quaternary mirror 312. Beams 404a and 404b which are incident on the quaternary mirror 312 are substantially collimated and reflected (step 610) as beams 405a and 405b. Beams 405a and 405b are received (step 612) at the exit pupil 316. The multiple field of view imager 318 is then set to analyze (step 614) either the beams 405a associated with the ultra narrow field of view 400a or the beams 405b associated with the medium field of view 400b at the exit pupil 316. Again, in an alternative embodiment two separate imagers 318 can be used to analyze beams 405a and 405b at the same time.

The reflective telescope 300 can also be configured to be operated (step 616) in the bypass mode where the fold mirror 314 is moved into a position such that the beams 501a and 501b bypass the mirrors 306, 308, 310 and 312 in the reflective telescope 300 (see FIGS. 5A–5C). In particular, when the reflective telescope 300 is operated in the bypass mode then the incident beams 501a and 501b are reflected (step 618) by the fold mirror 314 directly to the exit pupil 316. The multiple field of view imager 318 is then used to analyze (step 620) either the beams 502a associated with the narrow field of view 500a or the beams 502b associated with the wide field of view 500b at the exit pupil 316. Again, in an alternative embodiment two separate imagers 318 can be used to analyze beams 502a and 502b at the same time.

Referring again to FIG. 3, there is illustrated the axes of each of the mirrors 306, 308, 310 and 312. Short dashed lines 361, 362, 363, and 364 show the imagined curvature extensions of the surfaces of mirrors 306, 308, 310 and 312 respectively. Long dashed lines 371, 372, 373, and 374 denote the axes of mirrors 306, 308, 310 and 312 respectively. In the preferred embodiment, axis 373, is not coaxial. This non-coaxiality together with an optimized optical power distribution and placement of mirrors 306, 308, 310 and 312 provides image non-obscuration and achieves optimum image quality. However, the primary mirror 306 and the secondary mirror 308 in particular may be coaxial depending upon specific design requirements, and still be within the scope of the invention. And, the quaternary mirror 312 can be coaxial with the reflected axes of mirrors 306 and 308 (reflected through the tertiary mirror 310) in alternative embodiments of this invention.

The reflective telescope 300 has a magnifying power that is determined by the ratio of the radii of curvature of the mirrors 306, 308, 310, 312 and 314 and their relative locations. Details about an exemplary 4× reflective telescope 300 is provided below with respect to TABLES 1–5 where the shapes of mirrors 306, 308, 310, 312 and 314 are concave, convex, flat, concave and flat respectively. TABLE 1 presents surface prescription data for a 4:1 image reduction embodiment of the reflective telescope 300. In TABLE 1, "decenter" (D(j)) defines a new coordinate system (displaced and/or rotated) which is used to define surfaces of the reflective telescope 300. The surfaces which follow a decenter are aligned on the local mechanical axis (z-axis) of the new coordinate system. And, this new mechanical axis remains in use until it is changed by another decenter. The order in which displacements and tilts are applied to a given surface is specified by using different decenter types which generate different new coordinate systems.

In TABLE 1, all dimensions are given in millimeters. And, positive radii of curvature means that the center of curvature is to the right and a negative radii of curvature means that the center of curvature is to the left. Moreover, the thickness indicates the axial distance to the next surface. Lastly in TABLE 1, A(i) indicates the aspheric mirror i defined by the following equation:

$$Z = \frac{(CURV)Y^2}{1 + \left(1 - (1+K)(CURV)^2 Y^2 \frac{1}{2}\right)} + (A)Y^4 + (B)Y^6 + (C)Y^8 + (D)Y^{10}$$

where the base curvature (CURV) and aspheric constants K, A, B, C, and D are given in TABLE 2.

In TABLE 3, aperture diameter is denoted by C-1 ... C-4 and aperture data in terms of diameter, decenter system and rotation are also. In TABLE 4, decenter system data are given wherein tilt configurations are defined by angles alpha, beta, and gamma (degrees) so as to follow standard cartesian coordinate system nomenclature. The trailing code RETU means return to the coordinate system preceding the decentration and BEND means tilting the coordinate system following the reflection by an amount equal to the tilt of the surface in question. Lastly, TABLE 5 describes the changes in the diameter from the large entrance pupil 302 (small field of view) to the small entrance pupil 304 (larger field of view).

TABLE 1*

| ELT/SUR GLASS NO. | RADIUS OF CURVATURE | SHAPE | THICKNESS OR SEPARATION | APERTURE DIMENSION X | APERTURE DIMENSION Y |
|---|---|---|---|---|---|
| OBJECT | INFINITE | FLAT | INFINITY | | |
| 1 | DECENTER(1) RETURN(1) | FLAT | | 0.0000 | 203.201 CIR |
| 2 (APE STOP) | DECENTER(2) RETURN(2) | FLAT | 230.0000 *1 | 50.800 | 152.400 C-1 |
| 3 REFL | DECENTER(3) −600.000 | A-1 | −225.5615 | 50.800 | 158.400 C-2 |
| 4 REFL | DECENTER(4) −235.740 RETURN (4) | A-2 | 191.8899 | 58.830 | 47.340 C-3 |
| 5 (INTERMEDIATE IMAGE) | | | −22.0032 | 83.596 CIR | |
| 6 REFL | DECENTER(5) INFINITE BEND(5) | FLAT | −235.0506 | 69.364 | 46.336 C-4 |
| 7 REFL | DECENTER(6) 318.427 RETURN(6) | A-3 | 332.2033 | 138.638 | 84.447 C-5 |
| IMAGE | DECENTER(7) INFINITE | FLAT | | | |

*It should be noted that the fold mirror 314 is not included in the prescription because it slides into a fairly arbitrary location when in the bypass mode.

TABLE 2

| ASPHERIC | CURV | K | A | B | C | D |
|---|---|---|---|---|---|---|
| A-1 | −0.00166667 | −1.022498 | −1.24509E−11 | 1.16283E−17 | 3.29315E−22 | −2.94741E−27 |
| A-2 | −0.00424197 | −3.958816 | 6.86026E−09 | −2.37716E−13 | 0.00000E+00 | 0.00000E+00 |
| A-3 | 0.00246046 | −0.880195 | −2.44896E−10 | 3.18391E−14 | −3.15074E−18 | 9.82924E−23 |

TABLE 3

APERTURE DATA

| APER-TURE | SHAPE | DIAMETER X | DIAMETER Y | DECENTER X | DECENTER Y | ROTATION |
|---|---|---|---|---|---|---|
| C-1 | RECTANGLE | 50.800 | 152.400 | | | |
| C-2 | RECTANGLE | 50.800 | 158.400 | 0.000 | 142.632 | 0.0 |
| C-3 | RECTANGLE | 58.830 | 47.340 | 0.000 | 36.029 | 0.0 |
| C-4 | RECTANGLE | 69.364 | 46.336 | 0.000 | 10.117 | 0.0 |
| C-5 | RECTANGLE | 138.638 | 84.447 | 0.000 | −44.478 | 0.0 |

TABLE 4

DECENTERING CONSTANTS

| DECENTER | X | Y | Z | ALPHA | BETA | GAMMA |
|---|---|---|---|---|---|---|
| D(1) (RETU) | 0.0000 | 125.0000 | 0.0000 | 0.0000 | 0.0000 | 0.0000 |
| D(2) (RETU) | 0.0000 | 125.0000 | 0.0000 | 0.0000 | 0.0000 | 0.0000 |
| D(3) | 0.0000 | −17.6319 | 0.0000 | 0.0000 | 0.0000 | 0.0000 |
| D(4) (RETU) | 0.0000 | 0.9317 | 0.0000 | 0.7540 | 0.0000 | 0.0000 |
| D(5) (BEND) | 0.0000 | 0.0000 | 0.0000 | −43.0000 | 0.0000 | 0.0000 |
| D(6) (RETU) | 0.0000 | 15.4670 | 0.0000 | −3.1189 | 0.0000 | 0.0000 |
| D(7) (RETU) | 0.0000 | −45.2111 | 0.0000 | −2.9264 | 0.0000 | 0.0000 |

A decenter defines a new coordinate system (displaced and/or rotated) in which subsequent surfaces are defined. Surfaces following a decenter are aligned on the local mechanical axis (z-axis) of the new coordinate system.
The new mechanical axis remains in use until changed by another decenter. The order in which displacements and tilts are applied on a given
surface is specified using different decenter types and these generate different new coordinate systems; those used here are explained below.
Alpha, beta, and gamma are in degrees.
DECENTERING CONSTANT KEY:

| TYPE | TRAILING CODE | ORDER OF APPLICATION |
|---|---|---|
| DECENTER | | DISPLACE (X, Y, Z) |
| | | TILT (ALPHA, BETA, GAMMA) |
| | | REFRACT AT SURFACE |
| | | THICKNESS TO NEXT SURFACE |
| DECENTER & RETURN | RETU | DECENTER (X, Y, Z, ALPHA, BETA, GAMMA) |
| | | REFRACT AT SURFACE |
| | | RETURN (−GAMMA, −BETA, −ALPHA, −Z, −Y, −X) |
| | | THICKNESS TO NEXT SURFACE |
| DECENTER & BEND | BEND | DECENTER (X, Y, Z, ALPHA, BETA, GAMMA) |
| | | REFLECT AT SURFACE |
| | | BEND (ALPHA, BETA, GAMMA) |
| | | THICKNESS TO NEXT SURFACE |

TABLE 5

| * ZOOM PARAMETERS | | POS. 1 | POS. 2 |
|---|---|---|---|
| *1 | = | 230.0000 | 321.3581 |
| SEMI-FIELD ANGLE | = | 0.6500 | 1.3350 |
| ENTR PUPIL DIAMETER | = | 203.2000 | 87.2000 |
| EXIT PUPIL DIAMETER | = | 50.7661 | 21.7846 |

Figure 7A:
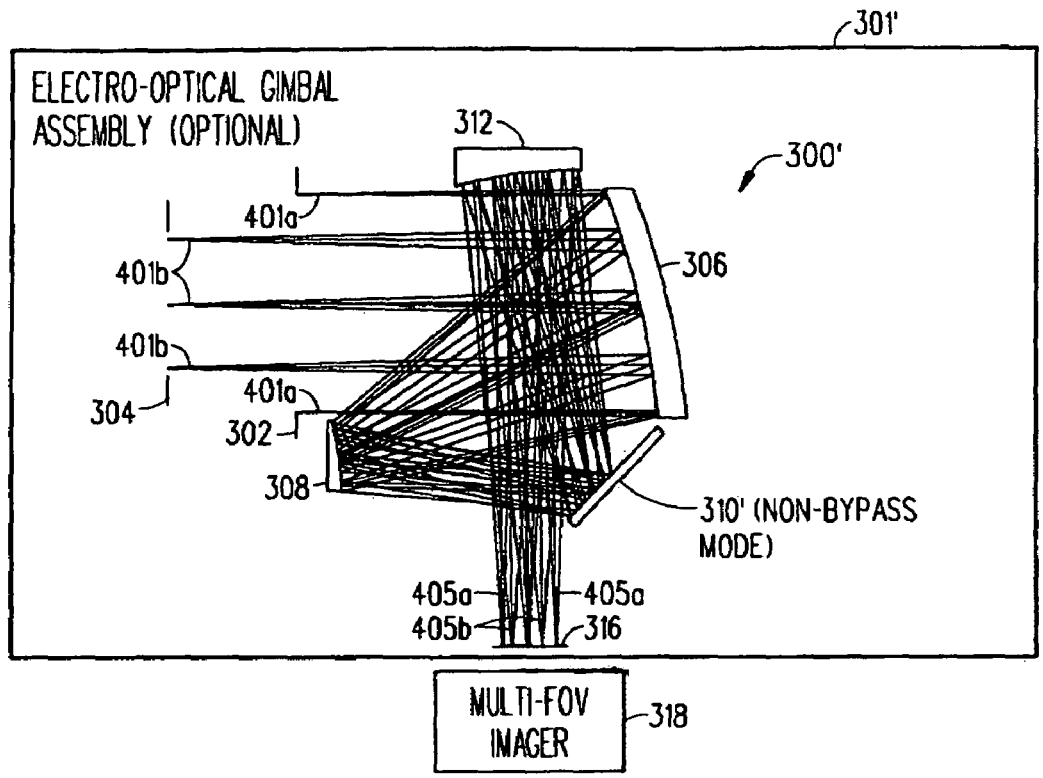
FIGS. 7A–7B are two diagrams of another embodiment of the reflective telescope where a tertiary mirror instead of the fold mirror (not present in this embodiment) can be positioned in a non-bypass mode (FIG. 7A) or a bypass mode (FIG. 7B) in accordance with the present invention.
Figure 7B:
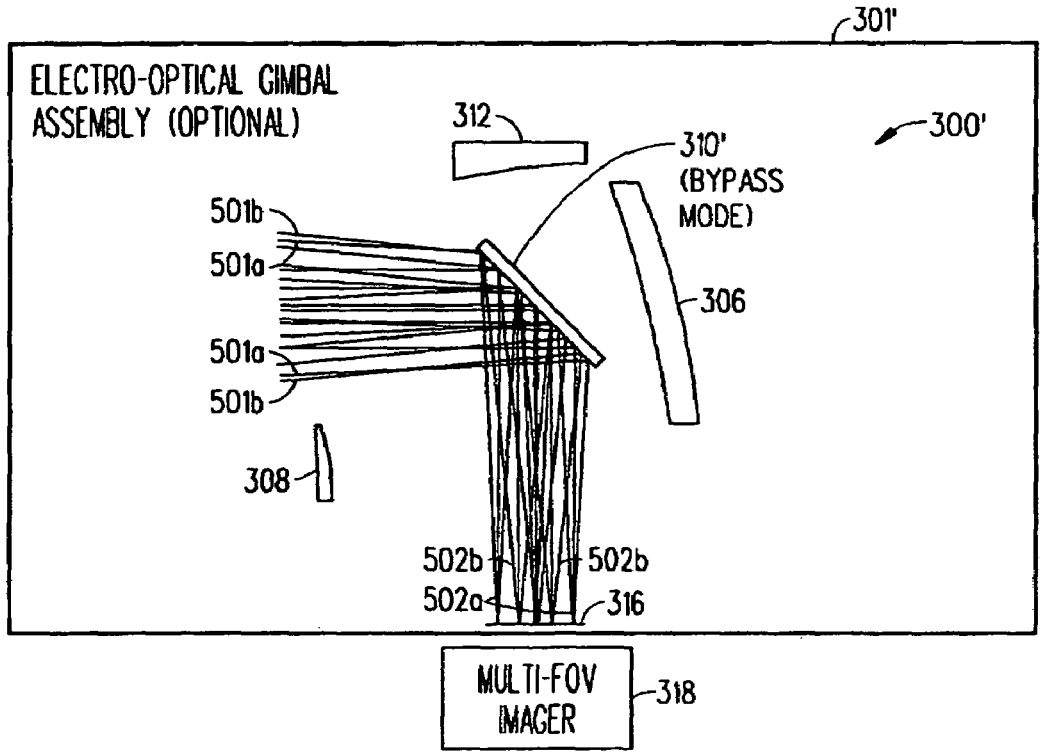

Referring to FIGS. 7A–7B, there are diagrams of another embodiment of the reflective telescope 300' in accordance with the present invention. The reflective telescope 300' is similar to the reflective telescope 300 except that the fold mirror 314 is not utilized and instead the tertiary mirror 310' can be rotated (and shifted) and positioned into the non-bypass mode (FIG. 7A) or the bypass mode (FIG. 7B). As can be seen, the reflective telescope 300' includes a first (large) entrance pupil 302, a second (small) entrance pupil 304, a primary mirror 306, a secondary mirror 308, a moveable tertiary mirror 310', a quaternary mirror 312 and an exit pupil 316. A multiple field of view imager 318 is also coupled to the exit pupil 316. In this embodiment, the tertiary mirror 310' is constrained to be completely flat (no curvature).

From the foregoing, it can be readily appreciated by those skilled in the art that the reflective telescopes 300 and 300' expand upon the traditional four mirror anastigmatic optical system 200 in at least two ways. First, the reflective telescopes 300 and 300' allow two separate aperture/field of view combinations to transverse the same telescope configuration, thereby creating two separate afocal functions. Second, the reflective telescopes 300 and 300' can be bypassed by the insertion of a fold mirror 314 between the primary and tertiary mirrors 306 and 310. When coupled with a multiple field of view imaging system 318 (for example, a two field of view refractive imager), then the telescope arrangement can create separate (4 or more) field of view functions. And in the alternative embodiment, the reflective telescope 300' has a tertiary mirror 310 which is a two-position component. One position for the telescope arrangement and another position to by-pass the other three mirrors 308, 310 and 312 (see FIGS. 7A–7B).

Following are some additional features, advantages and uses of the present invention:

The all-reflective (or catoptric) reflective telescopes 300 and 300' avoid chromatic aberration because there is no dispersion from a reflective surface as there is through a lens (which also produces transmission losses). As such, the reflective telescopes 300 and 300' allow a broad spectrum of electromagnetic radiation, from infrared to ultraviolet, to be magnified identically within the limits of geometric optics.

The tertiary mirror 310 is preferably disposed proximate to the internal image formed by the secondary mirror 308 when the reflective telescopes 300 and 300' are in the non-bypass mode. This allows the tertiary mirror 310 to control field aberrations such as coma and astigmatism, thereby providing large two-dimensional field of views which are substantially symmetric as either squares or circles.

The entrance pupils 302 and 304 may be disposed anywhere along incident beams 401a, 401b, 501a and 501b and one may be disposed at the primary mirror 306 to ensure the exit pupils 316 are coplanar.

The afocal, all-reflective (catoptric) reflective telescopes 300 and 300' provide significant magnifying power while minimizing aberration and providing full spectrum coverage at high wavefront quality.

The preferred embodiments of the reflective telescopes 300 and 300' have aspheric mirrors 306, 308, 310, and 312. And, the by-pass mirror 314 is flat.

The reflective telescopes 300 and 300' have a ball-like configuration which is makes them advantageously suitable to be packaged in an electro-optical gimbal assembly 301 and 301' (see FIGS. 3, 7A and 7B) In such an assembly, the reflective telescopes 300 and 300' would be well suited for use in airborne and outer space applications.

It should be noted that the multiple field of view imager 318 can analyze two, three or more field of views. For example, a commercially available multiple field of view imager 318 that can with some minor modifications be used in the present invention is sold under the brand name SC5500 by Oregon Camera Systems.

It should be noted that since the telescoped 300 and 300' are reflective their designs are not limited to the infrared spectral region. In fact, the reflective telescopes 300 and 300' can employ a beam splitter so it is possible to incorporate a visible channel and/or laser and/or other devices.

Although two embodiments of the present invention have been illustrated in the accompanying Drawings and described in the foregoing Detailed Description, it should be understood that the invention is not limited to the two embodiments disclosed, but is capable of numerous rearrangements, modifications and substitutions without departing from the spirit of the invention as set forth and defined by the following claims.

What is claimed is:

1. A reflective telescope comprising:
   a first entrance pupil;
   a second entrance pupil;
   a primary mirror for receiving and reflecting a first optical beam and a second optical beam that respectively passed through said first entrance pupil and said second entrance pupil;
   a secondary mirror for receiving and reflecting the first and second optical beams reflected from said primary mirror;
   a tertiary mirror for receiving and reflecting the first and second optical beams reflected from said secondary mirror;
   an exit pupil;
   a quaternary mirror for receiving the first and second optical beams reflected from said tertiary mirror and for reflecting the first and second optical beams to said exit pupil; and
   a fold mirror capable of being moved into a position where a third optical beam and a fourth optical beam are reflected directly to said exit pupil instead of being reflected by said primary mirror, said secondary mirror, said tertiary mirror and said quaternary mirror to said exit pupil.

2. The reflective telescope of claim 1, further comprising a multiple field of view imager for analyzing either the first optical beam or the second optical beam at said exit pupil when said fold mirror is positioned in a non-bypass mode wherein the third optical beam and the fourth optical beam are not reflected to said exit pupil.

3. The reflective telescope of claim 1, further comprising a multiple field of view imager for analyzing either the third optical beam or the fourth optical beam at said exit pupil when said fold mirror is positioned in a bypass mode wherein the first optical beam and the second optical beam are not reflected to said exit pupil.

4. The reflective telescope of claim 1, wherein said tertiary mirror is a flat tertiary mirror.

5. The reflective telescope of claim 1, wherein said primary mirror, said secondary mirror, said tertiary mirror, said fold mirror and said quaternary mirror are packaged in an electro-optical gimbal assembly.

6. A method for forming multiple fields of view, said method comprising the steps of:
   reflecting, at a primary mirror, a first optical beam that passed through a first entrance pupil;
   reflecting, at said primary mirror, a second optical beam that passed through a second entrance pupil;
   reflecting, at a secondary mirror, the first and second optical beams reflected from said primary mirror;
   reflecting, at a tertiary mirror, the first and second optical beams reflected from said secondary mirror;
   reflecting, at a quaternary mirror, the first and second optical beams reflected from said tertiary mirror;
   receiving, at an exit pupil, the first and second optical beams reflected from said quaternary mirror,
   forming, at a multiple field of view imager, a collimated region for either the first optical beam or the second optical beam received at said exit pupil;
   moving a fold mirror into a bypass position where a third optical beam and a fourth optical beam are reflected directly to said exit pupil instead of being reflected by said primary mirror, said secondary mirror, said tertiary mirror and said quaternary mirror to said exit pupil; and
   forming, at the multiple field of view imager, a region for either the third optical beam or the fourth optical beam received at said exit pupil.

7. An optical system comprising:
   a primary mirror for receiving and reflecting a first optical beam that passed through a first entrance pupil;
   said primary mirror for receiving and reflecting a second optical beam that passed through a second entrance pupil;
   a secondary mirror for receiving and reflecting the first and second optical beams reflected from said primary mirror;
   a tertiary mirror for receiving and reflecting the first and second optical beams reflected from said secondary mirror;
   a quaternary mirror for receiving the first and second optical beams reflected from said tertiary mirror and for reflecting the first and second optical beams to an exit pupil; and
   a fold mirror capable of being moved into a by-pass position where a third optical beam and a fourth optical beam are reflected directly to the exit pupil instead of being reflected by said primary mirror, said secondary mirror, said tertiary mirror and said quaternary mirror to said exit pupil.

8. The optical system of claim 7, further comprising an imager having multiple field of view modes for analyzing the first optical beam, the second optical beam, the third optical beam or the fourth optical beam at the exit pupil.

9. The optical system of claim 7, wherein:
said first entrance pupil has a relatively large aperture and a relatively ultra narrow field of view; and
said second entrance pupil has a relatively small aperture and a relatively medium field of view.

10. The optical system of claim 7, wherein said primary mirror has a racetrack shape.

11. The optical system of claim 7, wherein said primary mirror, said secondary mirror, said tertiary mirror said fold mirror and said quaternary mirror are packaged in an electro-optical gimbal assembly.

12. A method for enabling multiple afocal functions in a reflective telescope, said method comprising the steps of:
operating said reflective telescope in a non-bypass mode where the following steps are performed:
reflecting, at a primary mirror, a first optical beam and a second optical beam that respectively passed through a first entrance pupil and a second entrance pupil;
reflecting, at a secondary mirror, the first and second optical beams reflected from said primary mirror;
reflecting, at a tertiary mirror, the first and second optical beams reflected from said secondary mirror;
reflecting, at a quaternary mirror, the first and second optical beams reflected from said tertiary mirror;
receiving, at an exit pupil, the first and second optical beams reflected from said quaternary mirror; and
analyzing, at a multiple field of view imager, either the first optical beam or the second optical beam received at said exit pupil; or
operating said reflective telescope in a bypass mode where the following steps are performed:
moving a fold mirror into a position where a third optical beam and a fourth optical beam are reflected by said fold mirror directly to said exit pupil; and
and
analyzing, at the multiple field of view imager, either the third optical beam or the fourth optical beam received at said exit pupil.

13. The method of claim 12, wherein:
said first entrance pupil has a relatively large aperture and a relatively ultra narrow field of view; and
said second entrance pupil has a relatively small aperture and a relatively medium field of view.

14. The method of claim 12, wherein said primary mirror has a racetrack shape.

15. The method of claim 12, wherein said reflective telescope is packaged in an electro-optical gimbal assembly.

* * * * *